United States Patent [19]

Pfleger et al.

[11] Patent Number: 5,505,075

[45] Date of Patent: Apr. 9, 1996

[54] METHOD FOR RECOGNIZING STRETCHES OF ROUGH ROAD WITH THE AID OF A TANK PRESSURE SENSOR

[75] Inventors: Hartmut Pfleger, Regensburg; Manfred Wier, Wenzenbach; Maximilian Engl, Regensburg; Anton Angermaier, Landshut, all of Germany

[73] Assignee: Siemens Aktiengesellschaft, Munich, Germany

[21] Appl. No.: 242,137

[22] Filed: May 13, 1994

[30] Foreign Application Priority Data

May 13, 1993 [EP] European Pat. Off. .............. 93107841

[51] Int. Cl.$^6$ .............................. G01B 13/22; G01B 21/30
[52] U.S. Cl. ............................................................. 73/105

[58] Field of Search ......................................... 73/105, 37

[56] References Cited

FOREIGN PATENT DOCUMENTS 3434757  4/1986  Germany .
246440  10/1988  Japan .

Primary Examiner—Hezron E. Williams
Assistant Examiner—Daniel S. Larkin
Attorney, Agent, or Firm—Herbert L. Lerner; Laurence A. Greenberg

[57] ABSTRACT

A method for recognizing stretches of rough or bad road includes recognizing tank pressure values at successive evaluation instants. A change in tank pressure is ascertained from successive tank pressure values. A stretch of rough or bad road is recognized if the change exceeds a limit value.

12 Claims, 2 Drawing Sheets

METHOD FOR RECOGNIZING STRETCHES OF ROUGH ROAD WITH THE AID OF A TANK PRESSURE SENSOR

BACKGROUND OF THE INVENTION

1. Field of the Invention

The invention relates to a method for recognizing stretches of rough or bad road, by using a signal of a sensor that measures pressure in a fuel tank.

Recognizing stretches of rough road is especially necessary in methods that evaluate the roughness or non-concentricity of an internal combustion engine in order to ascertain combustion misfires. Due to its effects on a crankshaft, a stretch of rough road falsely indicates combustion misfires, in those methods. Such methods for detecting combustion misfires must therefore be blanked out when traveling over stretches of rough road.

In order to recognize stretches of rough road, methods are known that evaluate signals furnished by acceleration sensors which are mounted on axles or a body. However, such acceleration sensors are quite expensive.

Other methods evaluate wheel speeds or rpm. However, only vehicles that have an anti-lock brake system typically have the requisite wheel speed sensors.

2. Summary of the Invention

It is accordingly an object of the invention to provide a method for recognizing stretches of rough road with the aid of a tank pressure sensor, which overcomes the hereinafore-mentioned disadvantages of the heretofore-known methods of this general type.

With the foregoing and other objects in view there is provided, in accordance with the invention, a method for recognizing stretches of rough or bad road, which comprises recognizing tank pressure values at successive evaluation instants; ascertaining a change in tank pressure from successive tank pressure values; and recognizing a stretch of rough or bad road if the change exceeds a limit value.

The signal that a sensor outputs regarding the tank pressure is evaluated. Modern engine control systems already have this sensor, for monitoring the tank system.

A stretch of rough road causes deformation of the tank. In other words, a change in volume arises and therefore a change in pressure in the tank as well. The pressure changes that occur as a result of the stretch of rough road have a greater amplitude and a higher frequency than the pressure changes of the kind that occur during normal driving, for instance during cornering.

In the method of the invention, the tank pressure value, which is cyclically sampled by a tank pressure sensor, is evaluated at selectable time intervals.

The evaluation rate is ascertained by experimentation, because it depends on the mechanical construction of the tank. Moreover, it can be selected to be dependent on the vehicle speed and on the fill level in the tank.

In order to evaluate stretches of rough road, the variable of interest is the change in the tank pressure over time.

Various calculation methods are possible for this purpose.

For instance, in accordance with another mode of the invention, the difference can be formed from successive sampled values. In other words, the changes in the tank pressure over time are ascertained. The amounts of the differences being ascertained can then be subjected to averaging as well, for instance by sliding averaging.

If the thus-ascertained values of change in the tank pressure exceed a predeterminable limit value, the conclusion is drawn that a stretch of rough road is present, and the combustion misfire detector is, for instance, blanked out. The blanking out can be performed for a fixed time interval, or until such time as the change values drop below the limit value again.

In accordance with a further mode of the invention, the limit values are ascertained by experimentation as a function of the vehicle speed, the tank fill level, or other operating variables of the engine, and are stored in memory in a performance graph, for instance.

In accordance with an added mode of the invention, the averaging constant can also be stored in memory in a performance graph as a function of operating variables and as a function of the evaluation rate.

In accordance with a concomitant mode of the invention, there is provided a method which, for instance, includes adding up the amounts of the changes in tank pressure over a predeterminable time interval and only then comparing the sum with a limit value.

The present method for recognizing stretches of rough road by means of a tank pressure sensor can naturally be combined with other known methods for detection of stretches of rough road. The presence of a stretch of rough road is indicated in this case only whenever one or more of these methods indicate a stretch of rough road with a predetermined reliability.

Other features which are considered as characteristic for the invention are set forth in the appended claims.

Although the invention is illustrated and described herein as embodied in a method for recognizing stretches of rough road with the aid of a tank pressure sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
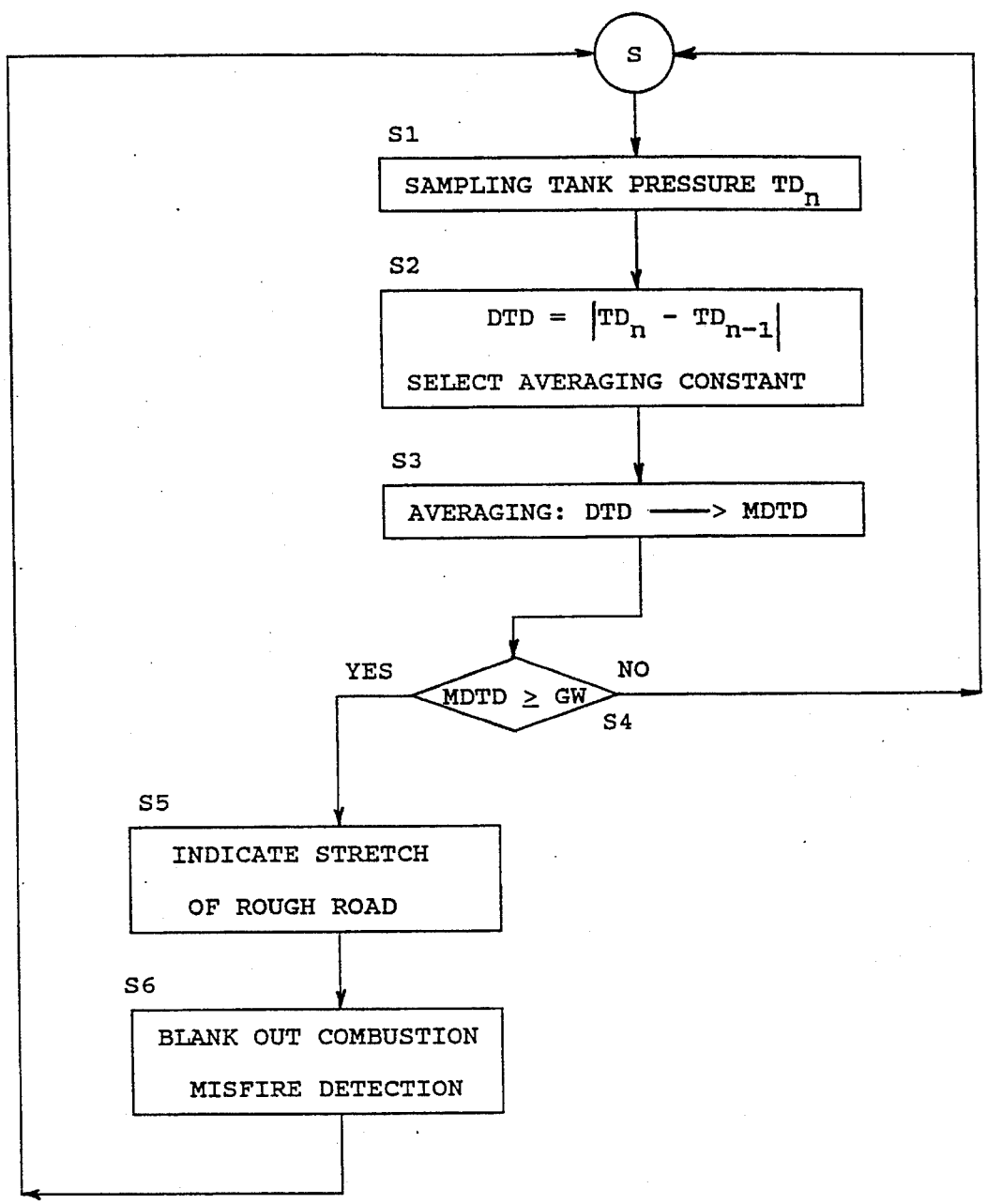
FIG. 1 of the drawing is a flow chart which shows the course of the method according to the invention, through the use of an example in which the aforementioned comparison of successive sampled values is employed for evaluation purposes.
Figure 2:
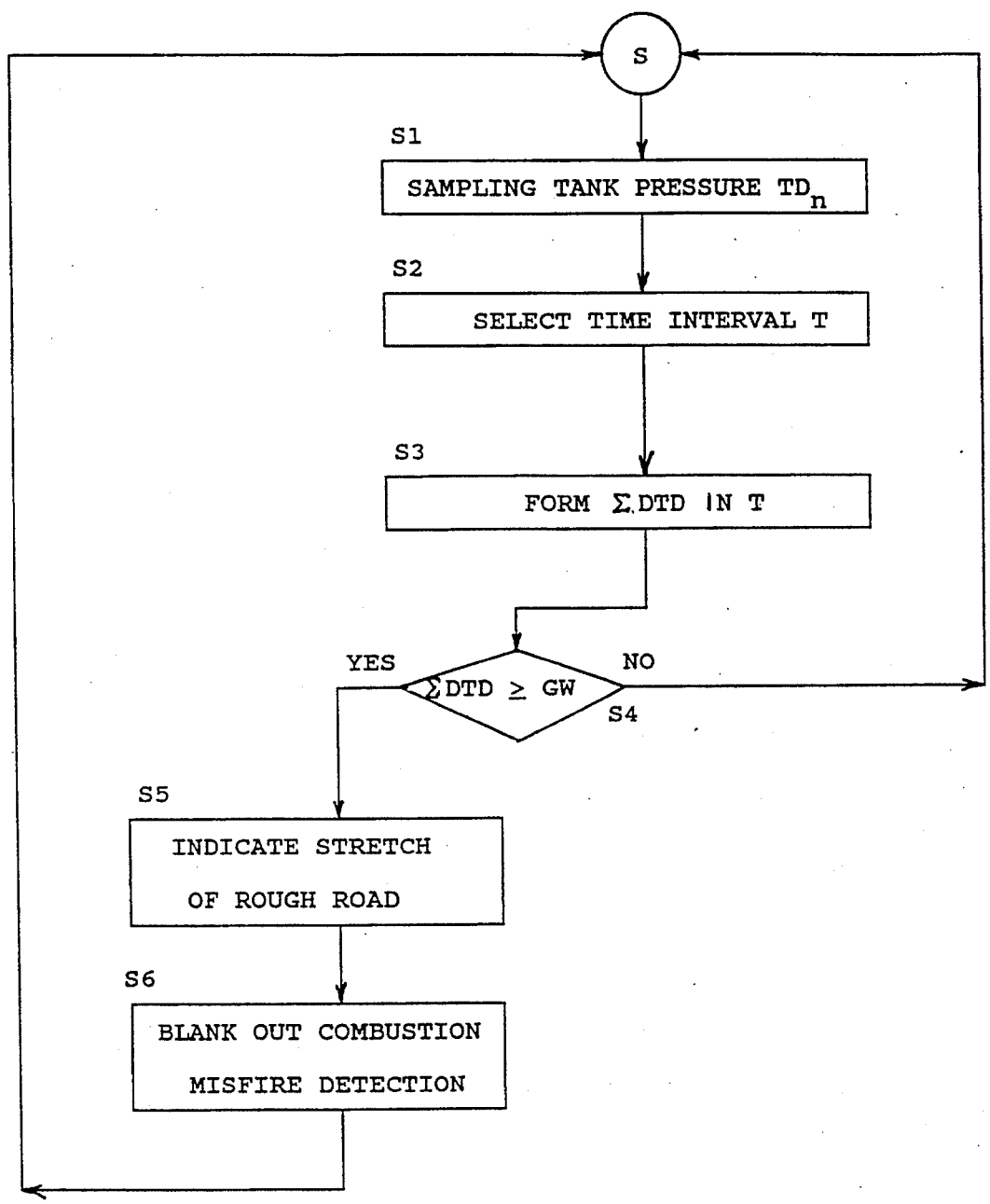
FIG. 2 is a similar chart illustrating an alternative method.

Referring now to the figures of the drawing in detail, there is seen a method step S1 in which a value of a tank pressure $TD_n$ is ascertained and stored in a buffer memory, wherein n represents successive evaluation instants n. In a method step S2, an amount of a difference DTD between the last two successive measured tank pressure values $TD_n$ and $TD_{n-1}$ is formed.

In a method step S3, this differential amount DTD is subjected to averaging, for instance sliding averaging to form an averaged differential value MDTD.

In a method step S4, this averaged differential value MDTD is compared with a limit value GW. By way of example, this limit value may be taken from a performance graph as a function of a current vehicle speed and a current fill level of the tank.

If the differential value MDTD is greater than the limit value GW, then in a method step S5 a stretch of rough road is indicated, and in a method step S6 a combustion misfire detector is blanked out.

However, if the differential value MDTD is less than or equal to the limit value, then no stretch of rough road is present, and the misfire detector is not blanked out, or is turned back on again if it had been previously blanked out.

In both cases, a return is then made to a start S of the method.

We claim:

1. A method for recognizing stretches of rough road, which comprises:

recognizing tank pressure values at successive evaluation instants;

ascertaining a change in tank pressure from successive tank pressure values; and recognizing a stretch of rough road if the change exceeds a limit value.

2. The method according to claim 1, which comprises averaging the change in tank pressure with a selectable averaging constant, prior to comparison with the limit value.

3. The method according to claim 1, which comprises forming amounts of the change in tank pressure, adding up the amounts over a predeterminable time interval to form a sum, and first comparing the sum with a predeterminable limit value.

4. The method according to claim 1, which comprises taking the limit value from a performance graph as a function of current operating variables of an engine.

5. The method according to claim 1, which comprises taking the limit value from a performance graph as a function of a current vehicle speed and fill level of the tank.

6. The method according to claim 1, which comprises taking an evaluation rate for evaluating the tank pressure from a performance graph as a function of current operating variables of an engine.

7. The method according to claim 1, which comprises taking an evaluation rate for evaluating the tank pressure from a performance graph as a function of a current vehicle speed and a current fill level of the tank.

8. The method according to claim 2, which comprises taking the averaging constant from a performance graph as a function of an evaluation rate of the tank pressure and current variables of the vehicle.

9. The method according to claim 2, which comprises taking the averaging constant from a performance graph as a function of an evaluation rate of the tank pressure, a vehicle speed and a fill level of the tank.

10. The method according to claim 1, which comprises blanking out a method for detecting combustion misfires of an internal combustion engine if a stretch of rough road is recognized.

11. The method according to claim 10, which comprises carrying out the blanking out step for a predeterminable duration.

12. The method according to claim 10, which comprises carrying out the blanking out step until a differential value defined by the change is above the limit value.

* * * * *